UNITED STATES PATENT OFFICE.

CHARLES A. CATLIN, OF PROVIDENCE, RHODE ISLAND.

PROCESS OF PREPARING SALT FOR TABLE USE.

SPECIFICATION forming part of Letters Patent No. 273,256, dated March 6, 1883.

Application filed June 12, 1882. (No specimens.)

*To all whom it may concern:*

Be it known that I, CHARLES A. CATLIN, of Providence, in the State of Rhode Island, have invented a new and useful Process of Preparing Salt for Table Use; and I do hereby declare that the following specification is a full, clear, and exact description thereof.

It is well understood that common salt, by reason of contamination with slight amounts of deliquescent chlorides of lime and magnesia, will in damp weather gather so much moisture that its use as a condiment will be rendered extremely inconvenient by reason of its adhesive qualities, and that subsequently, upon drying, it will become so hard and lumpy as to require crushing before it can be used.

The object of my invention is to provide a process by which salt may be cheaply and effectively deprived of this deliquescent property.

In my invention I take salt in a fine crystallized state—such as is commonly called "table" or "dairy" salt—and moisten it with a solution containing the equivalent of the chlorides of lime and magnesia present, of a salt which, by reacting with these chlorides, shall result in products not possessing their deliquescent properties, and drying the moistened salt thus produced, and afterward crushing it to powdered form. I find, upon experiment, that the most efficient as well as the cheapest solution to use for this purpose is that of carbonate or bicarbonate of soda in water.

The operation of my invention is as follows: Upon a tight floor I place, say, about five tons of the salt to be treated, and, having determined approximately the deliquescent chlorides present, from a sample of the same, I make a solution of carbonate of soda, soda-oil, or sal-soda in amount equivalent to them, as nearly as practicable. I have found that two per cent. of an anhydrous carbonate of soda will cover the amount required in most cases, leaving a slight excess, which can be of no material injury. The amount of water employed in making the solution of the carbonate of soda should be governed by the condition of the salt to be treated, and should always be sufficient to thoroughly moisten the material to be treated. The salt spread out upon the floor is thoroughly moistened with the soda solution, sprinkled over it by means of some suitable distributing apparatus, and a thorough mixture made by shoveling it over and over until uniform consistency is attained throughout the mass, care being taken to crush all lumps and to have a uniform distribution of the solution among the chloride-of-sodium crystals. The mass is then dried, by exposure to the air, upon the floor, or in an oven or kiln, or by any other convenient means, and when dry is crushed. The product of the process described will remain, under ordinary atmospheric conditions, a loose, dry crystalline powder or mass of granules, which will not collect moisture by exposure in damp weather or harden into cakes or lumps in dry weather.

The reaction of the carbonate of soda with the chloride of lime and magnesia is too well understood to require particular explanation, and results in substances all of which are harmless, and which do not increase the impurity of the whole. The product of my process will be freed from the bitter chlorides of lime and magnesia, which are converted into tasteless carbonates, which in certain uses of salt—as for dairy purposes—is of no little importance.

I am aware that it is not new to deprive crystallized or manufactured salt of its hygroscopic properties by mixing therewith carbonate or bicarbonate of soda in powdered form. Furthermore, I know that the impurities in manufactured salt have been decomposed or neutralized by washing the salt in a solution of carbonate or bicarbonate of potash or soda in saturated brine.

I disclaim all broadness of invention and base my claim on the special process herein described, which involves the sprinkling of the salt with a solution containing any of the substances heretofore employed for neutralizing the chlorides, the agitation of the salt in a thorough manner while the sprinkling operation is being performed, and finally drying and crushing the salt, so as to adapt it for table use.

What I claim as my invention, and desire to secure by Letters Patent, is—

The process herein described of neutralizing the chlorides in manufactured or crystallized salt, consisting in sprinkling the same with a solution of bicarbonate of soda or its described equivalent, thoroughly agitating the salt simultaneously with the sprinkling operation, then drying, and finally crushing it, as and for the purpose herein set forth.

CHAS. A. CATLIN.

Witnesses:
WALTER B. VINCENT,
CHARLES H. TITUS.